(12) United States Patent
Kreft

(10) Patent No.: US 6,398,116 B1
(45) Date of Patent: Jun. 4, 2002

(54) CHIP CARD WITH AT LEAST TWO COIL DEVICES FOR TRANSFERRING DATA AND/OR ENERGY

(75) Inventor: Hans-Diedrich Kreft, Dassendorf (DE)

(73) Assignee: Angewandte Digital GmbH, Dassendorf (DE)

( * ) Notice: Subject to any disclaimer, the term of this patent is extended or adjusted under 35 U.S.C. 154(b) by 0 days.

(21) Appl. No.: 09/446,403
(22) PCT Filed: Jun. 22, 1998
(86) PCT No.: PCT/DE98/01712
§ 371 Date: Mar. 17, 2000
(87) PCT Pub. No.: WO99/01844
PCT Pub. Date: Jan. 14, 1999

(30) Foreign Application Priority Data

Jun. 20, 1997 (DE) .......................................... 197 26 335

(51) Int. Cl.⁷ ................................................. G06K 19/06
(52) U.S. Cl. ....................................... 235/492; 235/435
(58) Field of Search ................................. 235/492, 435; 340/10.34

(56) References Cited

U.S. PATENT DOCUMENTS 4,549,176 A  10/1985  Kreft ..................... 340/825.31

(List continued on next page.)

FOREIGN PATENT DOCUMENTS

| JP | 0886232 A2 | * | 12/1998 |
| JP | 411066260 A | * | 5/1999 |
| JP | 411306303 A | * | 11/1999 |

Primary Examiner—Michael G. Lee
Assistant Examiner—Seung Ho Lee

(74) Attorney, Agent, or Firm—Sonnenschein Nath & Rosenthal

(57) ABSTRACT

The invention relates to a chip card with at least two coil devices (2, 3) for transferring data and/or energy with a write/read device (terminal) without contacts and optionally, with contacts (1). One or several of the coils (2) of the first coil device (2) is/are a coil/s for the close coupled environment, and one or several of the coils (3) of the second coil device (3) is/are a coil/coils for the remote coupled environment. An electronics unit is able to differentiate between the coil devices (2, 3) according to different physical features e.g., phase and/or frequency and/or amplitude and/or energy differences. When the remote coupled environment (3) and close coupled environment coil(s) (2) are situated in an electromagnetic alternating field at the same time and enough energy is being supplied through the remote coupled environment coil(s), a stereo signal (S1) which takes on a characteristic value (A1) is generated in a first part (4) of said electronics unit (6). The differences in the electromagnetic alternating field between the remote coupled environment (3) and close coupled environment coil(s) (2) are used in the form of phase and/or frequency and/or amplitude and/or energy differences to produce a second characteristic value (A2) of the stereo signal (S1). When the differences in the electromagnetic alternating field between the remote coupled environment (3) and close coupled environment coil(s) (2) disappear, the stereo signal (S1) is either not produced or takes on a third value (A3). In both cases the chip card can still be used with its environment with restricted functions, for as long as the energy supplied from the remote coupled environment coils (3) permits. When the stereo signal (S1) with the second value (A2) is produced the chip card can be used with additional functions, using the stereo effect to fulfil different functions according to whether it is operating with the close coupled environment or the remote-coupled environment.

28 Claims, 1 Drawing Sheet

U.S. PATENT DOCUMENTS

| | | | |
|---|---|---|---|
| 4,602,253 A | 7/1986 | Kreft | 340/825.31 |
| 4,652,821 A | 3/1987 | Kreft | 324/208 |
| 4,698,996 A | 10/1987 | Kreft et al. | 73/1 |
| 4,796,028 A | 1/1989 | Mackenthum et al. | 340/825.58 |
| 4,928,087 A | 5/1990 | Kreft et al. | 340/825.71 |
| 5,206,495 A | 4/1993 | Kreft | 235/492 |
| 5,288,979 A | 2/1994 | Kreft | 235/380 |
| 5,376,778 A | 12/1994 | Kreft | 235/382 |
| 5,442,295 A | 8/1995 | Kreft | 324/537 |
| 5,473,323 A | 12/1995 | Kreft | 340/810.31 |
| 5,619,683 A | 4/1997 | Kreft | 395/800 |
| 5,648,761 A | 7/1997 | Kreft et al. | 340/825.31 |
| 5,999,409 A * | 12/1999 | Ando et al. | 235/492 |
| 6,137,447 A * | 10/2000 | Saitoh et al. | 343/742 |
| 6,194,993 B1 * | 2/2001 | Hayashi et al. | 340/10.34 |

* cited by examiner

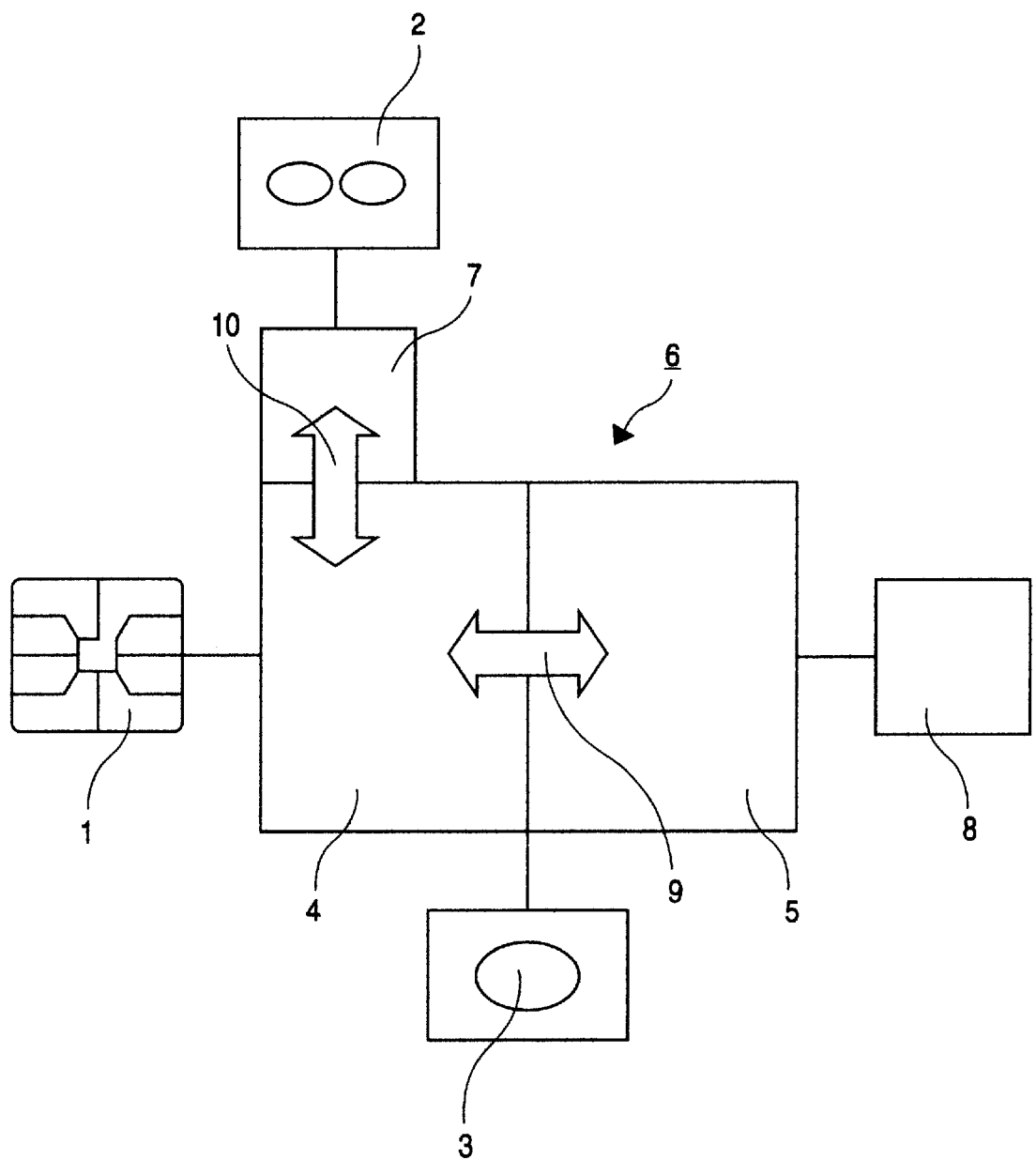

CHIP CARD WITH AT LEAST TWO COIL DEVICES FOR TRANSFERRING DATA AND/OR ENERGY

BACKGROUND OF THE INVENTION.

The invention is directed to a chip card having at least two coil arrangements for contact-free transmission of data and/or energy as well as, potentially, transmission of data and/or energy with contacts to a write/read device (terminal).

PRIOR ART AND OBJECTIVE

Contact-free chip cards are being increasingly used that exchange energy and data contact-free with their environment when they are located in an electromagnetic field that is generated by coils in a terminal. The distance between chip card and terminal can usually lie between a few millimeters (near range, close-coupled, described in ISO 10536) up to 15 centimeters (far range, remote-coupled, described in ISO 14443). Given these chip cards, there is the problem that, without being plugged into a terminal, they can be modified in their memory from a distance, unnoticed by the user.

DE 43 27 334 C1 has disclosed a chip card that can distinguish between near range and far range or, respectively, non-near range. A phase difference between two signals serves as distinguishing feature for near and far range, coils as described in ISO 10 536 being preferably suitable for the detection thereof. It is also possible to combine coil arrangements on the chip card, as described in ISO 14 443 and in ISO 10 536. Additionally, contacts can also be present on the chip cards. With these different communication elements (coils according to ISO 14 443, ISO 10 536 and contacts), chip cards can exchange data and energy with their environment in the greatest variety of ways. For security reasons, a distinction is made between the utilization of a chip card in the near range of a terminal, for example by insertion into a slot, from that in the far range. Data that, for example, represent amounts of money should only be capable of being loaded when the chip card is plugged into a slot of a terminal and is located within the protected terminal. It should be impossible, namely, for specific memory areas on the chip card or specific functions of the chip card to be activated from a distance unnoticed by the user. DE 43 27 334 A1 in fact discloses how a signal is generated that indicates the near range between chip card and terminal. However, nothing is stated about the interaction between the coils for the far range, the near range and the contacts.

In detail thereto, DE 43 27 334 A1 has disclosed a chip card for contactless data transfer with a terminal comprising a transmission element with contactless energy supply having at least two reception elements separated from one another for the reception of electromagnetic, optical or acoustic alternating fields. A first electronics E1 is provided on the chip card that edits the alternating field components received at the reception elements without interpretation of the intensities and outputs these to a second electronics E2 as signals. A phase shift in the signals that occurs between the received alternating field components is unambiguously imaged, whereby a signal having a specific level PHS is output at the signal output of the electronics E2 when the phase difference between the two signals exceeds a constant, preset value; otherwise, a signal having a different level PHS' is output. In detail thereto, DE 43 27 334 A1 has disclosed a chip card for contactless data transfer with a terminal comprising a transmission element with contactless energy supply having at least two reception elements separated from one another for the reception of electromagnetic, optical or acoustic alternating fields. A first electronics E1 is provided on the chip card that edits the alternating field components received at the reception elements without interpretation of the intensities and outputs these to a second electronics E2 as signals. A phase shift in the signals that occurs between the received alternating field components is unambiguously imaged, whereby a signal having a specific level PHS is output at the signal output of the electronics E2 when the phase difference between the two signals exceeds a constant, preset value; otherwise, a signal having a different level PHS' is output. The level PHS indicates that the reception elements are located in a spatial region neighboring the transmission elements, what is referred to as the stereo separation region, whereby the signal with the level PHS is used for activating specific functions of the chip card in the stereo separation region. In particular, the phase shift to be interpreted and, as a result thereof, the signal PHS can be made available by a plurality of alternating field sources at different locations in that these sources exhibit different phase positions compared to one another and these different alternating fields superimpose in the surrounding space and thereby cause different, resulting phase gradients dependent on location. In particular, the constant value is permanently set to such a quantity that no near end operation is possible outside the capture range of the terminal. How a signal that indicates the near range between chip. card and terminal is generated can thus in fact be derived from DE 43 27 334 A1. However, nothing is stated about the collaboration between the coils for the far range, the near range and the contacts. The level PHS indicates that the reception elements are located in a spatial region neighboring the transmission elements, what is referred to as the stereo separation region, whereby the signal with the level PHS is used for. activating specific functions of the chip card in the stereo separation region. In particular, the phase shift to be interpreted and, as a result thereof, the signal PHS can be made available by a plurality of alternating field sources at different locations in that these sources exhibit different phase positions compared to one another and these different alternating fields superimpose in the surrounding space and thereby cause different, resulting phase gradients dependent on location. In particular, the constant value is permanently set to such a quantity that no near end operation is possible outside the capture range of the terminal. How a signal that indicates the near range between chip card and terminal is generated can thus in fact be derived from DE 43 27 334 A1. However, nothing is stated about the collaboration between the coils for the far range, the near range and the contacts.

DE 39 35 364, further, has disclosed a chip card that automatically distinguishes in a chip between the functions of contact operation and contact-free operation. Here, too, no distinction is made between various function levels that are characterized by different ranges.

In conformity with the aforementioned preamble of the invention, DE 195 09 517 C1 has disclosed an apparatus with a card terminal for transmission of energy and data to chip cards via electromagnetic waves, whereby the electromagnetic waves sent from the various card terminals differ in terms of one or more physical features such as amplitude, frequency, phase, energy density, spatial direction, electrical or magnetic field components. For receiving the electromagnetic waves, the chip card contains an electronic circuit that interprets the waves according to their physical features and activates different function parts of the circuit according to the result and, accordingly, the energy and data exchange ensues according to the specific functions of the respectively activated function parts of the circuit.

DE 42 05 827 A1 has disclosed a chip card for contact-free, bidirectional transmission of energy and data with a terminal that comprises a microprocessor and a memory as well as a coil for the near range, an electromagnetic resonator for the far range as well as an energy store and a manually actuatable switch.

Upon actuation of the switch, an encoded, remotely acting electromagnetic alternating field of the resonant circuit is initiated for data transmission from or into the memory.

TECHNICAL OBJECTIVE

The invention is therefore based on the object of creating a chip card of said species that controls different functionings of the chip or parts thereof dependent on the indication of near range and/or far range upon utilization of the stereo effect.

DESCRIPTION OF THE SOLUTION OF THE PATENT AND THE ADVANTAGES THEREOF

The inventive solution of the object is characterized by a chip card having at least two coil arrangements for contact-free transmission of data and/or energy as well as, potentially, transmission of data and/or energy with contacts to a write/read device (terminal), whereby one or more of the coils of the first coil arrangement are coils for the near range (near range or stereo coils) and one or more of the coils of the second coil arrangement are coils for the far range (far range coils), with an electronics that is connected to the coil arrangements and, potentially, to the contacts and that is suitable for distinguishing between the different coil arrangements according to different physical features such as phase and/or frequency and/or amplitude and/or energy differences, whereby a) a stereo signal (S1) is generated in a first part of the electronics, this stereo signal (S1) assuming a first characteristic value (A1) when the far range and the near range coil (s) are simultaneously located in an electromagnetic alternating field and the energy feed via the far range coil (s) suffices in order to activate the electronics or at least the first part; b) whereby differences in the electromagnetic alternating field between the far range and the near range coil (s) in the form of phase and/or frequency and/or amplitude and/or energy differences are utilized in order to generate a second characteristic value (A2) of the stereo signal (S1); c) when the differences in the electromagnetic alternating field between the far range and the near range coil (s) disappear, the stereo signal (S1) fails to arrive as a result thereof or assumes a further, third characteristic value (A3) and, in both instances, the chip card remains useable with its environment with unlimited functions as long as the energy that is beamed in from the far range coil (s) allows this; d) by contrast whereto, given presence of the stereo signal (S1) with the second characteristic value (A2), the chip card can be employed with additional functions beyond the limited function.

It is advantageously possible as a result of the invention to control the function of a chip card dependent on the indication of near range and/or far range and to thereby utilize the stereo effect or, respectively, a stereo signal created as a result thereof. It is thus possible to activate different security levels given access to memories or memory parts dependent on the function near range or far range.

In a further development given presence of the stereo signal (S1) with the first value (A2) an adequate energy feed via the near range coil (s), the first part of the electronics or, respectively, of the chips has dominance over all other parts or, respectively, electronic parts, so that it is capable of optionally switching the other parts or, respectively, electronics on or off and/or is capable of activating or deactivating specific functions in the other parts or, respectively, electronics parts.

Given a chip card with contacts, a communication via the contacts is interrupted and/or is controlled dependent on the corresponding stereo signal (S1) given the presence of the stereo signal (S1) with the first or second or third value (A1, A2, A3).

A further, second electronics part is directly connected to the near range coil or coils, this making the signals arriving via the near range coil or coils available to the electronics and/or to the first part thereof in a form comparable to the signals upon reception via the contacts, for example rectification, so that the further, second electronic part implements functions like those that can be implemented given reception of the signals via the contacts.

Advantageously, at least one further, third electronics part is present that, given the presence of one of the different values (A1, A2, A3) or given absence of the stereo signal (S1), outputs an optical or acoustic signal that can be perceived by a human, a user of the chip card being thus in the position to distinguish between different functionings.

In addition, at least some of the far range coil or coils and/or of the near range coil or coils can be implemented as capacitors that likewise serve the purpose of transmitting data and/or energy. Given a chip card with contacts, only near range coil or coils and/or capacitors can thereby be present, whereby the stereo signal (S1) assumes different values (A1, A2, . . . , An) that respectively serve for the control of the functions of electronics of the chip card.

Advantageously, energy and data via the far range coil or coils and/or the near range coil or coils and/or data and energy via the contacts are exchanged in alternation, whereby the data entering from the contacts are output via the coils and the data input via coils are output via the contacts.

Given employment of different frequencies as a physical distinguishing feature, a different frequency is advantageously coupled into the near range coil or coils 2 than into the far range coil or coils 3, in that the localized coil of the terminal neighboring the near range coil or coils 2 oscillates with a different frequency than that coil of the terminal that is coupled to the far A range coil or coils 3 of the chip card.

BRIEF DESCRIPTION OF THE DRAWING

The FIGURE shows a block circuit diagram of the individual function modules of an inventive chip card.

DETAILED DESCRIPTION OF THE PREFERRED EMBODIMENT

The FIGURE schematically shows the individual parts of the chip card disclosed in the patent. Reference numeral 1 symbolizes a contact field 1 or, respectively, contacts that is connected to an electronics 6 or, respectively, a chip 6. The chip 6 is essentially composed of the two parts 4 and 5 between which data and energy can be exchanged according to arrow 9. A stereo signal (S1) is generated in the part 4; the part 5 can, for example, accommodate a memory or various memories as well as an arithmetic unit. Near range or stereo coils 2 are connected to a second electronics part 7 that adds the signal or, respectively, energy inputs via the near range coils 2 in a form like that made available to the chip card 6 via the contacts 1. The second electronics part 7 communicates with the part 4 of the chip 6 via the communication link 10. Far range coils 3, for example those of resonance circuits having different characteristic data, are connected to the chip 6. A third electronics part 8 outputs acoustic or optical or some other type of signals dependent on different values A1, A, A3 of the stereo signal.

A stereo signal S1 is generated in the part 4, which is part of the chip 6. This stereo signal S1 can be generated by differences in the signal inputs of the near range coil or coils 2 and/or of the far range coil or coils 3.

The coils 2, 3 can be a matter of a combination, whereby a small coil is contained in a larger coil surrounding it. It can also be a matter of a coil arrangement as described in ISO 10 536, whereby this coil arrangement can likewise be geometrically located within the area of a larger coil. In this way, it is possible that both coils in the far range are permeated by the same electromagnetic field but an additional field in the near range is localized exactly where the near range coil or coils 2 is located. This localization can be achieved in that a coil is geometrically placed such in a terminal that, given insertion of the chip card into the terminal, it comes to lie in the immediate proximity of the near range coil or coils. As a result of this arrangement, it is assured that the near range coil or coils 2 receives a weak signal in the far range but a strong signal in the near range. The near range coil or coils 3 are not disturbed in function in the far range since the signal for the near range coil or coils 2 would be too weak in the far range. A decoupling in the near range can ensue, for example, on the basis of different frequencies. Both coils 2, 3 can also have their turns linked to one another, as a result whereof they can have their energy receptions intensified or attenuated dependent on the connecting circuit, namely in series or parallel. On the basis of these developments, it is possible to obtain signals and energies in the first coil arrangement that are different compared to the second coil arrangement. These differences in the electromagnetic infeeds into the near range coil or coils 2 and/or far range coil or coils 3 can be electronically interpreted with the electronics 6 and can be imaged in the different values of the stereo signal S1.

The stereo signal S1 can assume a characteristic value A1 when the near range coil or coils 2, simultaneously with the far range coil or coils 3, are located in an alternating electromagnetic field, and the energy feed via only the far range coil or coils 3 suffices in order to activate the chip 6 or at least parts 4, 5 of the chip 6. This first characteristic value A1 thus signals that both far range coil or coils 3 as well as near range coil or coils 2 receive signals, whereby the energy supply for the chip 6 is completely adequate via the far range coil or coils 3. It is thus assured that a chip card that is brought from the infinite far range into the proximity of a terminal emitting electromagnetic waves generates the stereo signal S1 with the value A1. The chip card can assume functions as are usually present given chip cards according to ISO 14 443.

When the electronics 6 and/or the part 4 thereof can indicate differences in the electromagnetic alternating field between the far range coil or coils 3 and the near range coil or coils 2, the signal S1 assumes its second characteristic value A2. The differences in the alternating electromagnetic field can be physically used as phase differences, frequency differences, amplitude differences or energy differences or combinations thereof. DE 43 27 334 C1 discloses only the utilization of phase differences for indication between near operation and far operation. The phase difference is probably the best criterion in order to distinguish between near operation and far operation, since the superimposition of the oscillations of two transmitters such as two coils is established in the far range. Differences in the electromagnetic alternating field due to frequency and/or amplitude and/or energy differences are not advantageous in the same way. On the basis of suitable measures, via the far range as well, a signal difference can be generated in the near range coil or coils 2 and far range coil or coils 3 in all of these instances that simulate the operation "near range". According to the patent, however, it is possible to couple a different frequency, for example, into the near range coil or coils 2 than into the far range coil or coils 3. This occurs, for example, in that the localized coil in the terminal neighboring the near range coil or coils 2 oscillates with a different frequencythan the coil in the terminal that couples with the far range coil or coils 3 When the chip 6 or, respectively, the part 4 detects a frequency difference, the stereo signal S1 is switched from the first characteristic value A1 into its second value A2. The same occurs when a phase difference arises between near range coil or coils 2 and far range coil or coils 3.

When the differences in the electromagnetic alternating field between the inputs via the near range coil or coils 2 and far range coil or coils 3 disappear, then the stereo signal S1 should also not be generated or it should assume a further characteristic, third value A3. Given the presence of this third value A3, the information that the second value A2 of the stereo signal S1 was present and is no longer present is present in the electronics 6. What this means for the chip card user is that the chip card was in the region of a near field and is now no longer situated therein. Different functions, which differ from those that were controlled with the values A1 or, respectively, A2, can be controlled with the third value A3. It is thus assured that the chip card remains useable with unlimited functions as long as it receives adequate energy beamed in via the far range coil or coils 3. When the stereo signal S1 with the value A2 is present, it is assured that all additional functions beyond the limited functions given the values A1 or, respectively, A3 are active. The functions can be allocated to specific security levels, so that the highest security level is allocated to the near range with A2 of the stereo signal.

When adequate energy is supplied via the near range coil or coils 2, i.e., when the near range coupling suffices in order to supply the chip 6 or, respectively, the part 4, the part 4 can assume dominance over all other electronics parts. Since, according to the invention, the stereo signal S1 has the value A2 in this case, it is assured the highest security level is only active when and only when the chip card is located in the near range of a terminal. A precondition therefor is that the energy via the near range coil or coils 2 suffices in order to keep at least the part 4 of the electronics 6 active. In this case, a decision can be made via the part 4 of the electronics 4 as to whether, for example, specific, further chip parts or inputs and outputs are turned on or, respectively, off.

The stereo signal S1 indicates different statuses with its three values A1, A2, A3. Dependent on these values, a decision can be made as to whether communication can continue to be carried out by the contacts 1 in that only data are exchanged or whether energy should also be made available via the contacts or whether the contacts should be disconnected.

The second electronics part 7 is directly connected to the near range coil or coils 2. In this electronics part, the signal and/or energy inputs are edited via the near range coil or coils 2 in a form, comparable to the inputs via the contacts 1. It is thus assured that the electronics 6 can fulfill all functions that are designed for a communication via the contacts 1 in a way that is unmodified compared to a contact operation. A multiplier value in the part 5 of the chip 6 can thus receive data via the coupling link 2 in the same way as via the contact link 1.

A third electronics part 8 is present in addition to the electronics part 6 or as part of 6, this third electronics part 8, dependent on the values A1, A2, A3 of the stereo signal S1, outputting optical, acoustic or some other signals perceptible for a human. Upon perception of the different signals, it is possible for a user to judge the status, security mode in which the chip card is working. With this signal, it is possible for a chip card user to determine whether, for example, the highest security level is activated by the value A2 in a closed terminal. This can ensue with an acoustic signal; the third electronics part 8, however, can also represent a visual display that is contained on the chip card and, after insertion into a terminal, indicates when removed that the value A2 was activated. A user can thus immediately see that the highest security level of his chip card was activated.

When, in a specific embodiment, far range coil or coils 3 are omitted, the far range operation is possible only in limited form. When, however, contacts 1 are additionally present on the chip card, a stereo signal S1 can be generated that is capable of assuming different values A1, A2 , . . . An, whereby these values A1, A2,. An characterize contact functions or mixed function, namely both contact-affected as well as contact-free.

It can be meaningful for testing purposes to send data that enter via coils and/or contacts via the respectively further input/output paths. The functioning of specific chip cards can be tested in this way in that data are supplied via the near range coil or coils 2 and their correct processing and output is tested via the contacts 1 or far range coils 3 or vice versa.

Capacitors can also be at least partly employed instead of near range or stereo coils 2 and/or far range coils 3. In this case, signals or, respectively, data are preferably transmitted via these capacitors, since an energy transmission by utilizing electrical field properties (energy density of the electrical field) via capacitor plates is not suitable in the same way as an energy transmission via the magnetic field densities given coil couplings.

All electronic circuit parts, namely the electronics 6, the first part 4 of the electronics 6, the second part 5 of the electronics 6, the second electronic part 7 and the third electronics part 8, can be integrated in a single chip 6, as it is also possible to construct parts thereof as separate circuits that are functionally connected to one another.

COMMERCIAL UTILIZATION

The inventive chip card having at least two coil arrangements can be commercially utilized in order control such chip cards dependent on the indication of near range and/or far range and to thereby utilize the stereo effect. The utility of the invention is particularly comprised therein that, given access to the memory or memory parts of the chip, different security levels can be activated dependent on the function near range or far range and, thus, the chip card is capable of fulfilling different functions upon utilization of the stereo effect dependent on the near range operation or far range operation.

As is apparent from the foregoing specification, the invention is susceptible of being embodied with various alterations and modifications which may differ particularly. from those that have been described in the preceding specification and description. It should be understood that I wish to embody within the scope of the patent warranted hereon all such modifications as reasonably and properly come within the scope of my contribution to the art.

What is claimed is:

1. A chip card with at least two coil arrangements for contact-free transmission as well as, potentially, contact-effected transmission with contacts of data and/or energy to a write-read device, whereby one or more of the coils of the first coil arrangement are coils for the near range and one or more of the coils of the second coil arrangement are coils for the far range, with an electronics that is connected to the coil arrangements and, potentially, to the contacts and that is suitable for distinguishing between the different coil arrangements according to different physical features such as phase or frequency or amplitude or energy differences, whereby a) a stereo signal is generated in a first part of the electronics, this stereo signal assuming a first characteristic value when the far range and the near range coil or coils are simultaneously located in an electromagnetic alternating field and the energy feed via the far range coil or coils suffices in order to activate the electronics or at least the part, b) differences in the electromagnetic alternating field between the far range coil or coils and the near range coil or coils in the form of phase, frequency or amplitude and/or energy differences are utilized in order to generate a second characteristic, value of the stereo signal, c) when the differences in the electromagnetic alternating field between the far range coil or coils and the near range coil or coils disappear, the stereo signal fails to arrive as a result thereof or assumes a further, third characteristic value and, in both these instances, the chip card remains unuseable with its environment with limited function as long as the energy that is beamed in from the far range coil or coils allows it, d) by contrast whereto, given presence of the stereo signal with the second characteristic value, the chip card is useable with additional functions beyond the limited function.

2. A chip card according to claim 1, wherein, given the presence of said stereo signal with said first value and adequate energy feed via said near range coil or coils, said first part of said electronics has dominance over all further parts of said electronics, so that said first part of said electronics is capable of optionally switching the other electronics parts on or off and/or activating or deactivating specific functions in said other electronics parts.

3. A chip card according to claim 1 with contacts, wherein give the presence of said stereo signal with said first or second or third value, a communication via said contacts is interrupted is controlled dependent on said corresponding stereo signal.

4. A chip card according to claim 1, wherein a second electronic part is directly connected to said near range coil or coils, said second electronics part making said signals entering via said near range coil or coils, said second electronics part making said signals entering via said near range coil or coils available to said electronics or parts thereof in a form comparable to said signals given input via said contacts, for example rectification, so that said second electronics part implements functions of a type that can also be implemented give reception of said signals via contacts.

5. A chip card according to claim 1, wherein a third electronics part is present that, given said presence of one of said different values or given an absence of said stereo signal, outputs an optical or acoustic signal perceptible to a human, wherewith a user of said chip card is capable of distinguishing between different functionings.

6. A chip card according to claim 1, wherein at least a part of said far range coil or coils and of said near range coil or coils are fashioned as capacitors that likewise serve for said transmission of data or energy.

7. A chip card according to claim 6, with contacts, wherein only near range coil or coils or capacitors are present, and said stereo signal assumes different values that respectively serve for the control of said functions of said electronics of said chip card.

8. A chip card according to claim 1, with contacts, wherein energy and data via said far range coil or coils or said near range coil or coils or data and energy via said contacts are exchanged in alternation, whereby said data arriving from said contacts are output via said coils and said data input via coils are output via said contacts.

9. A chip card according to claim 1, wherein, given employment of different frequencies as physical distinguishing feature, a different frequency is coupled into said near range coil or coils than into said far range coil or coils, in that said localized coil of said terminal neighboring said near range coil or coils oscillates with a different frequency from that coil of said terminal that is coupled to said far range coil or coils of said chip card.

10. A chip card comprising:
   at least two coil arrangements comprising a first and a second coil arrangement for transmission of at least one of data and energy to a write-read device,
   at least one coil of said first coil arrangement comprising a coil for a near range transmission,
   an electronics connected to said coil arrangements which is adapted to distinguish between said different coil arrangements according to different physical features thereof, whereby
   a) a stereo signal is generated in a first part of the electronics, said stereo signal assuming a first characteristic value when said far range and said near range coils are simultaneously located in an electromagnetic alternating field and an energy feed via said far range coil suffices in order to activate at least said first part of said electronics,
   b) differences in said electromagnetic alternating field between said far range coil and said near range coil are utilized to generate a second characteristic value of said stereo signal,
   c) when said differences in said electromagnetic alternating field between said far range coil and said near range coil disappear, said stereo signal fails to arrive as a result thereof or assumes a further, third characteristic value and, in both these instances, said chip card remains useable with its environment with limited function as long as said energy that is beamed in from said far range coil allows it,
   d) by contrast whereto, given presence of said stereo signal with said second characteristic value, said chip card is useable with additional functions beyond said limited function.

11. A chip card according to claim 10, wherein said electronics includes other parts in addition to said first party, and, given the presence of said stereo signal with said first value and adequate energy feed via said near range coil, said first part of said electronics has dominance over all other parts of said electronics, so that said first part is capable of at least one of switching said other electronics parts on or off and activating or deactivating specific functions in said other electronics parts.

12. A chip card according to claim 10, wherein said chip card further includes contacts for effecting transmission of at least one of data and energy to said write-read device, wherein given the presence of said stereo signal with said first or second or third value, a communication via said contacts at least one of is interrupted and controlled, dependent on said corresponding stereo signal.

13. A chip card according to claim 12, wherein a second electronic part is directly connected to said near range coil or coils, said second electronics part making said signals entering via said near range coil or coils available to said electronics thereof in a form comparable to said signals given input via said contacts, so that said second electronics part implements functions of a type that can also be implemented given reception of said signals via said contacts.

14. A chip card according to claim 10, wherein a third electronics part is present that, given said presence of one of said different values or given an absence of said stereo signal, outputs an optical or acoustic signal perceptible to a human, wherewith a user of said chip card is capable of distinguishing between different functionings.

15. A chip card according to claim 10, wherein at least a part of said far range coil and of said near range coil or coils are fashioned as capacitors that likewise serve for said transmission of at least one of data and energy.

16. A chip card according to claim 15, wherein said chip card further includes contacts for effecting transmission of at least one of data and energy to said write-read device, wherein only a near range coil is present, and said stereo signal assumes different values that respectively serve for the control of said functions of said electronics of said chip card.

17. A chip card according to claim 10, wherein said chip card further includes contacts for effecting transmission of at least one of data and energy to said write-read device, wherein energy and data via said far range, coil said near range coil and data and energy via said contacts are exchanged in alternation, whereby said data arriving from said contacts are output via said coils and said data input via coils are output via said contacts.

18. A chip card according to claim 10, wherein, given employment of different frequencies as said physical distinguishing feature, a different frequency is coupled into said near range coil than into said far range coil, in that said localized coil of said terminal neighboring said near range coil oscillates with a different frequency from that coil of said terminal that is coupled to said far range coil of said chip card.

19. A method of operating a chip card having at least two coil arrangements for transmission of at least one of data and energy to a write-read device, at least one coil of said first coil arrangement comprising a coil for a near range transmission, at least one coil of said second coil arrangement comprising a coil for a far range transmission, and an electronics connected to said coil arrangements which is adapted to distinguish between said different coil arrangements according to different physical features thereof, comprising the steps:
   generating a stereo signal, in a first part of said electronics, of a first characteristic value when said far range and said near range coils are simultaneously located in an electromagnetic alternating field and an energy feed via said far range coil suffices in order to activate at least said first part of said electronics, enabling said chip card to perform limited functions with its environment as long as said energy that is beamed in from said far range coil allows it,
   generating a second characteristic value of said stereo signal based upon differences in said electromagnetic alternating field between said far range coil and said near range coil, enabling said chip card to perform a full range of functions with its environment in addition to said limited functions, disabling said chip card from performing said fall range of functions once said differences in said electromagnetic alternating field between said for range coil and said near range coil disappear, and enabling said chip card to perform only said limited functions with its environment as long as said energy that is beamed in from said far range coil allows it.

20. A method according to claim 19, including the step of generating a third characteristic value of said stereo signal when said differences in said electromagnetic alternating field between said far range coil and said near range coil disappear, and based upon said third characteristic value, enabling said chip card to perform only said limited functions with its environment as long as said energy that is beamed in from said far range coil allows it.

21. A method according to claim 19, wherein said electronics includes other parts in addition to said first part, and given the presence of said stereo signal with said first value and adequate energy feed via said near range coil, said first part of said electronics dominates over all further parts of said electronics, so that said first part is capable of at last one of switching said other electronics parts on or off and activating or deactivating specific functions in said other electronics parts.

22. A method according to claim 19, wherein said chip card further includes contacts for effecting transmission of at least one of data and energy to said write-read device, wherein given the presence of said stereo signal with said first or second or third value, at least one of interrupting and controlling a communication via said contacts dependent on said corresponding stereo signal.

23. A method according to claim 22, wherein a second electronic part is directly connected to said near range coil including the step of, said second electronics part making said signals entering via said near range coil or coils available to said electronics in a form comparable to said signals given input via said contacts, for example rectification, so that said second electronics part implements functions of a type that can also be implemented given reception of said signals via said contacts.

24. A method according to claim 19, wherein a third electronics part is present that, given said presence of one of said different values or given an absence of said stereo signal, including the step of outputting an optical or acoustic signal perceptible to a human, wherewith a user of said chip card is capable of distinguishing between different functionings.

25. A method according to claim 19, wherein at least a part of said far range coil and of said near range coil are fashioned as capacitors that likewise serve for said transmission of data and energy.

26. A method according to claim 25, wherein said chip card further includes contacts for effecting transmission of at least one of data and energy to said write-read device, wherein only near range coil and capacitors are present, and including a step wherein said stereo signal assumes different values that respectively serve for the control of said functions of said electronics of said chip card.

27. A method according to claim 19, wherein said chip card further includes contacts for effecting transmission of at least one of data and energy to said write-read device, including the step wherein energy and data via said far range coil and said near range coil and via said contacts are output via said coils and said data input via coils are output via said contacts.

28. A method according to claim 19, wherein, given employment of different frequencies as said physical distinguishing feature, including the step wherein a different frequency is coupled into said near range coil than into said far range coil, in that said localized coil of said terminal neighboring said near range coil oscillates with a different frequency from that coil of said terminal that is coupled to said far range coil of said chip card.

* * * * *